United States Patent
Zhang et al.

(10) Patent No.: US 10,212,645 B2
(45) Date of Patent: Feb. 19, 2019

(54) METHOD AND DEVICE FOR CONDUCTING INFORMATION SHARING BROADCAST BASED ON WI-FI

(71) Applicant: ZTE CORPORATION, Shenzhen (CN)

(72) Inventors: Baisheng Zhang, Shenzhen (CN); Huipeng Zeng, Shenzhen (CN)

(73) Assignee: XI'AN ZHONGXING NEW SOFTWARE CO., LTD, Shaanxi (CN)

( * ) Notice: Subject to any disclaimer, the term of this patent is extended or adjusted under 35 U.S.C. 154(b) by 57 days.

(21) Appl. No.: 15/318,110

(22) PCT Filed: Aug. 5, 2014

(86) PCT No.: PCT/CN2014/083753
§ 371 (c)(1),
(2) Date: Dec. 12, 2016

(87) PCT Pub. No.: WO2015/188432
PCT Pub. Date: Dec. 17, 2015

(65) Prior Publication Data
US 2017/0127339 A1    May 4, 2017

(30) Foreign Application Priority Data

Jun. 10, 2014  (CN) .......................... 2014 1 0256489

(51) Int. Cl.
*H04W 84/12* (2009.01)
*H04W 48/10* (2009.01)
(Continued)

(52) U.S. Cl.
CPC .......... *H04W 48/10* (2013.01); *H04L 12/189* (2013.01); *H04L 12/1859* (2013.01); *H04W 4/06* (2013.01);
(Continued)

(58) Field of Classification Search
None
See application file for complete search history.

(56) References Cited

U.S. PATENT DOCUMENTS

| 9,497,598 B2 * | 11/2016 | Liu .......................... H04W 4/06 |
| 2014/0079044 A1 * | 3/2014 | Ding ..................... H04W 84/12 370/338 |

(Continued)

FOREIGN PATENT DOCUMENTS

| CN | 102946591 A | 2/2013 |
| CN | 103179516 A | 6/2013 |

(Continued)

OTHER PUBLICATIONS

Office Action dated Sep. 19, 2017 for Canadian Patent Application No. 2951730.

(Continued)

*Primary Examiner* — Ayanah S George
(74) *Attorney, Agent, or Firm* — Plumsea Law Group, LLC (57) ABSTRACT

A method for performing a broadcast for information sharing based on Wi-Fi is disclosed in the present document. The method includes: when a broadcast data request is detected, acquiring target information to be broadcasted in the broadcast data request; according to a preset configuration rule, configuring the target information to generate broadcast data; and broadcasting the broadcast data through the Wi-Fi for a receiving terminal to receive, parsing the broadcast data to obtain the target information, and displaying the target information. A device for performing a broadcast for information sharing based on Wi-Fi is also disclosed in the present document. With the present document, broadcasting and receiving of information can be achieved in a case of not establishing a connection between user terminals.

6 Claims, 4 Drawing Sheets

(51) Int. Cl.
*H04L 12/18* (2006.01)
*H04W 4/06* (2009.01)
*H04W 72/04* (2009.01)
*H04W 4/12* (2009.01)

(52) U.S. Cl.
CPC .......... *H04W 72/0446* (2013.01); *H04W 4/12* (2013.01); *H04W 84/12* (2013.01)

(56) References Cited

U.S. PATENT DOCUMENTS

| | | | | |
|---|---|---|---|---|
| 2014/0105097 A1* | 4/2014 | Liu | ........................ | H04W 4/12 370/312 |
| 2014/0112237 A1* | 4/2014 | Chen | ................... | H04W 72/005 370/312 |
| 2017/0127339 A1 | 5/2017 | Zhang et al. | | |

FOREIGN PATENT DOCUMENTS

| CN | 103220752 A | 7/2013 |
|---|---|---|
| EP | 3142456 A1 | 3/2017 |
| JP | 2006245906 A | 9/2006 |
| JP | 2011114377 A | 6/2011 |

OTHER PUBLICATIONS

PCT International Search Report dated Mar. 11, 2015, Application No. PCT/CN2014/083753, 3 Pages.

Office Action dated Feb. 27, 2018 from counterpart Japanese Patent Application No. 2016-572499.

International Standard, "Information technology—Telecommunications and information exchange between systems—Local and metropolitan area networks—Specific requirements—Part 11: Wireless LAN medium access control (MAC) and physical layer (PHY) specifications", Reference No. ISO/IEC/IEEE 8802-11:2012(E), First Edition Nov. 1, 2012, 2798 Pages.

Extended European Search Report dated May 16, 2017, Application No. 14894809.4-1854 / 3142456 PCT/CN2014083753, Applicant ZTE Corporation, 11 Pages.

* cited by examiner

METHOD AND DEVICE FOR CONDUCTING INFORMATION SHARING BROADCAST BASED ON WI-FI

CROSS-REFERENCE TO RELATED APPLICATIONS

This application is the U.S. national phase of PCT Application No. PCT/CN2014/083753 filed on Aug. 5, 2014, which claims priority to Chinese Patent Application No. 201410256489.9 filed on Jun. 10, 2014, the disclosures of which are incorporated in their entirety be reference herein.

TECHNICAL FIELD

The present document relates to the field of wireless communication technology, and particularly, to a method and device for performing a broadcast for information sharing based on Wi-Fi.

BACKGROUND

For the current Wi-Fi terminals, before performing data transmission and information sharing, a connection must be established between the terminals. With regard to a plurality of data transmissions with a very small amount of data, the overheads for establishing the connection between the terminals may exceed the data transmission itself, such as transmitting a phone number or transmitting an internet address and so on.

In addition, for sharing of certain public information, such as public transportation information of the bus station, railway timetable information of the railway station, weather information and location information and so on, it is more inclined to use a broadcast mechanism. The broadcast mechanism is a way that information can be released without establishing a connection between the terminals, which has features such as convenient maintenance, low costs and no excessive user interventions.

SUMMARY

The main object of the present document is to achieve broadcasting and receiving of public information in a case of not establishing a connection between user terminals.

In order to achieve the foregoing object, the present document provides a method for performing a broadcast for information sharing based on Wi-Fi. The method for performing a broadcast for information sharing based on the Wi-Fi includes the following steps: acquiring target information to be broadcasted in a broadcast data request when the broadcast data request is detected; configuring the target information to generate broadcast data according to a preset configuration rule; and broadcasting the broadcast data through the Wi-Fi for a receiving terminal to receive, parsing the broadcast data to obtain the target information, and displaying the target information.

Alternatively, the step of configuring the target information to generate broadcast data according to a preset configuration rule includes: acquiring an information type identifier of the target information to be broadcasted and a public information activity frame identifier; configuring the public information activity frame identifier in an organizationally unique identifier type field of a public activity frame of an MAC layer of a wireless local area network communication protocol, configuring the information type identifier of the target information in an organizationally unique identifier subtype field of the public activity frame of the MAC layer of the wireless local area network communication protocol, configuring the target information to be broadcasted in an element field of the public activity frame of the MAC layer of the wireless local area network communication protocol, and generating the broadcast data.

Alternatively, said configuring the target information to be broadcasted in an element field of the public activity frame of the MAC layer of the wireless local area network communication protocol, and generating the broadcast data includes: according to a preset format of a first data frame, configuring the target information to be broadcasted to generate the first data frame; according to a preset format of a second data frame, configuring the first data frame to generate the second data frame; and configuring the second data frame in the element field, and generating the broadcast data.

Alternatively, the first data frame includes an attribute identification number field, a first length field and an attribute domain field; the attribute identification number field is used for identifying an attribute of the target information, the first length field is used for identifying a length of the target information, and the attribute domain field is used for configuring the target information; the second data frame includes a second length field, a first organizationally unique identifier type field and an attribute field; the second length field is used for identifying a length of the first data frame; the first organizationally unique identifier type field is used for identifying an element type of the target information; and the attribute field is used for configuring the first data frame.

In addition, in order to achieve the foregoing object, the present document further provides a device for performing a broadcast for information sharing based on Wi-Fi. The device for performing a broadcast for information sharing based on the Wi-Fi includes an information acquisition module, a broadcast data configuration module and an information broadcast module; herein, the information acquisition module is configured to, when a broadcast data request is detected, acquire target information to be broadcasted in the broadcast data request; the broadcast data configuration module is configured to, according to a preset configuration rule, configure the target information to generate broadcast data; and the information broadcast module is configured to broadcast the broadcast data through the Wi-Fi for a receiving terminal to receive, parse the broadcast data to obtain the target information, and display the target information.

Alternatively, the broadcast data configuration module is configured to acquire an information type identifier of the target information to be broadcasted and a public information activity frame identifier; configure the public information activity frame identifier in an organizationally unique identifier type field of a public activity frame of an MAC layer of a wireless local area network communication protocol, configure the information type identifier of the target information in an organizationally unique identifier subtype field of the public activity frame of the MAC layer of the wireless local area network communication protocol, configure the target information to be broadcasted in an element field of the public activity frame of the MAC layer of the wireless local area network communication protocol, and generate the broadcast data.

Alternatively, the broadcast data configuration module is further configured to, according to a preset format of a first data frame, configure the target information to be broadcasted to generate the first data frame; according to a preset format of a second data frame, configure the first data frame to generate the second data frame; and configure the second data frame in the element field, and generate the broadcast data.

Alternatively, the first data frame includes an attribute identification number field, a first length field and an attribute domain field; the attribute identification number field is used for identifying an attribute of the target information, the first length field is used for identifying a length of the target information, and the attribute domain field is used for configuring the target information; the second data frame includes a second length field, a first organizationally unique identifier type field and an attribute field; the second length field is used for identifying a length of the first data frame; the first organizationally unique identifier type field is used for identifying an element type of the target information; and the attribute field is used for configuring the first data frame.

With a method for performing a broadcast for information sharing based on Wi-Fi in the present document, firstly, when a broadcast data request is detected, target information to be broadcasted in the broadcast data request is acquired; secondly, according to a preset configuration rule, the target information is configured to generate broadcast data; finally, the broadcast data are broadcasted through the Wi-Fi for a receiving terminal to receive, and the broadcast data are parsed to obtain the target information, and the target information is displayed. In the present document, broadcasting and receiving of information can be achieved in a case of not establishing a connection between user terminals, so that the present document is maintained conveniently, costs low, and does not require excessive user interventions.

The achievement of the object, functional characteristics and advantages of the present document will be further described in combination with the embodiments and with reference to the accompanying drawings.

SPECIFIC EMBODIMENTS

The technical scheme of the present document will be further described in combination with the accompanying drawings of the specification and specific embodiments below. It should be understood that the specific embodiments described here are only used to explain the present document and not used to limit the present document.

The present document provides a method for traffic supervision based on a token bucket.

Figure 1:
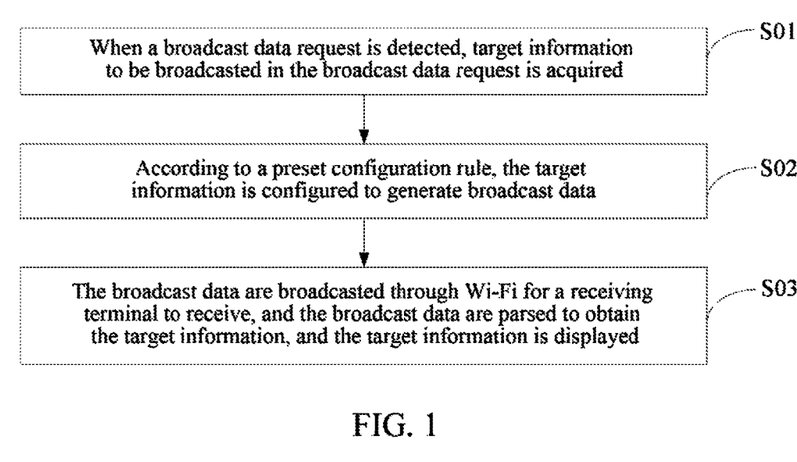
FIG. 1 is a flow chart of a method for performing a broadcast for information sharing based on Wi-Fi according to an embodiment of the present document.

With reference to FIG. 1, FIG. 1 is a flow chart of a method for performing a broadcast for information sharing based on Wi-Fi according to an embodiment of the present document.

In one embodiment, the method for performing a broadcast for information sharing based on the Wi-Fi includes the following steps.

In step S01, when a broadcast data request is detected, target information to be broadcasted in the broadcast data request is acquired.

Specifically, in the embodiment, when the broadcast data request is detected, the target information to be broadcasted in the broadcast data request is acquired. In the embodiment, types of the target information to be broadcasted may be help information, business card information, weather information, internet address information, advertisement information, location information, time information, public transportation information or short message or the like.

In step S02, according to a preset configuration rule, the target information is configured to generate broadcast data.

Specifically, in the embodiment, when the target information to be broadcasted is acquired in the step S01, the acquired target information is configured to generate the broadcast data according to the preset configuration rule. In the embodiment, the step S02 specifically includes the following steps.

In step S021, an information type identifier of the target information to be broadcasted and a public information activity frame identifier are acquired.

Specifically, according to the descriptions above, information types of the target information to be broadcasted include the help information, business card information, weather information, internet address information, advertisement information, location information, time information, public transportation information and short message and so on. Each type of the target information above is identified in the embodiment. The help information is identified as 0x0 (0x represents a hexadecimal, similarly hereinafter). The business card information is identified as 0x1. The weather information is identified as 0x2. The internet address information is identified as 0x3. The advertisement information is identified as 0x4. The location information is identified as 0x5. The time information is identified as 0x6. The public transportation information is identified as 0x7. And the short message is identified as 0x8. A public information activity frame is identified as 0xFF in the embodiment. For example, when the target information is the business card information, an information type of the target information to be broadcasted acquired in the step S021 is identified as 0x1, and the acquired public information activity frame is identified as 0xFF.

In step S022, the public information activity frame identifier is configured in an organizationally unique identifier type field of a public activity frame of an MAC layer of a wireless local area network communication protocol, the information type identifier of the target information is configured in an organizationally unique identifier subtype field of the public activity frame of the MAC layer of the wireless local area network communication protocol, the target information to be broadcasted is configured in an element field of the public activity frame of the MAC layer of the wireless local area network communication protocol, and the broadcast data are generated. In the embodiment, the broadcast data are also called the public information activity frame.

Figure 2:
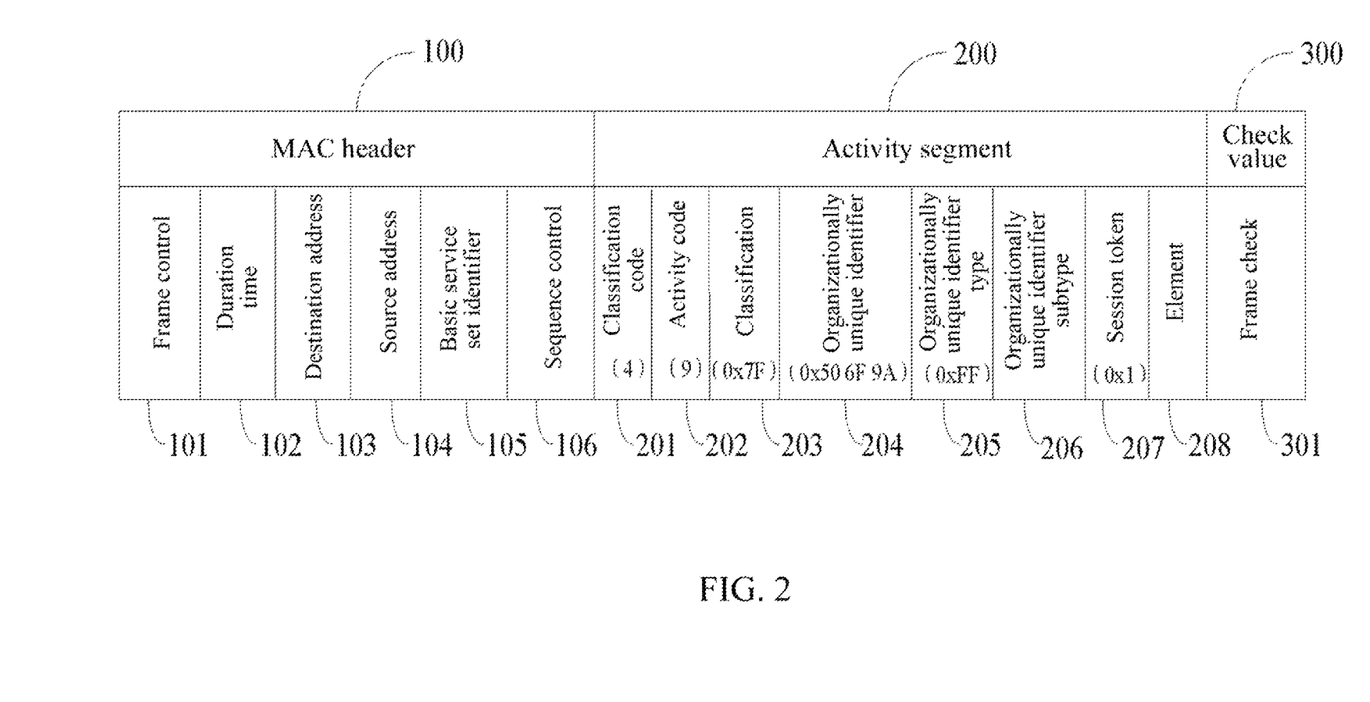
FIG. 2 is a schematic diagram of a standard format of a public activity frame in the method for performing a broadcast for information sharing based on Wi-Fi according to the present document.

In the embodiment, the foregoing wireless local area network communication protocol is IEEE802.11. FIG. 2 is a schematic diagram of a standard format of the public activity frame in the method for performing a broadcast for information sharing based on Wi-Fi according to the present document. With reference to FIG. 2, in the embodiment, the public activity frame of the Medium Access Control MAC layer of the IEEE802.11 includes an MAC header 100, an activity segment 200 and a check value 300. Herein, fields of the MAC header 100 include frame control 101, a duration time 102, a destination address 103, a source address 104, a basic service set identifier 105 and sequence control 106. Fields of the activity segment 200 include a classification code 201, an activity code 202, classification 203, an organizationally unique identifier 204, an organizationally unique identifier type 205, an organizationally unique identifier subtype 206, a session token 207 and an element 208. And the check value 300 includes frame check 301. In the embodiment, according to the definition of the public activity frame of the MAC of the IEEE802.11 in the IEEE802.11, a value of the above classification code 201 is 4, which represents that the data frame shown in FIG. 2 is a public activity frame, and a value of the above activity code 202 is 9, which represents that the data frame shown in FIG. 2 is an activity frame customized by IEEE802.11 manufacturers.

Moreover, the classification 203 in the activity segment 200 is customized by the IEEE802.11 manufacturers. In the embodiment, the value of the classification 203 is 0x7F. The organizationally unique identifier 204 is an organizationally unique identifier defined by the Wi-Fi alliance. In the embodiment, the value of the organizationally unique identifier is 0x50 6F 9A, and the value of the session token 207 is 0x1. The organizationally unique identifier type 205, organizationally unique identifier subtype 206 and element 208 are three fields required to be extended by the above preset configuration rule in the embodiment.

In the embodiment, the public information activity frame identifier is configured in an organizationally unique identifier type field of the public activity frame of the MAC layer of the wireless local area network communication protocol; and the information type identifier of the target information is configured in an organizationally unique identifier subtype field of the public activity frame of the MAC layer of the wireless local area network communication protocol. According to the foregoing descriptions, since the public information activity frame is identified as 0xFF in the embodiment, that is, a configuration value of the organizationally unique identifier type 205 in the public activity frame shown in FIG. 2 is 0xFF (in the embodiment, the configuration value of the organizationally unique identifier type 205 may be any value which is not occupied, that is, the value of the above public information activity frame identifier may be any value which is not occupied). In the embodiment, configuration values of the organizationally unique identifier subtype 206 corresponding to various types of the target information are as shown in Table 1.

TABLE 1

| Organizationally unique identifier subtype | Type of target information |
| --- | --- |
| 0x0 | Help information |
| 0x1 | Business card information |
| 0x2 | Weather information |
| 0x3 | Internet address information |

TABLE 1-continued

| Organizationally unique identifier subtype | Type of target information |
| --- | --- |
| 0x4 | Advertisement information |
| 0x5 | Location information |
| 0x6 | Time information |
| 0x7 | Public transportation information |
| 0x8 | Short message |
| 0x9 | Reserved |

That is, when the target information is the help information, a configuration value of the organizationally unique identifier subtype 206 corresponding to the help information is 0x0. When the target information is the business card information, the configuration value of the organizationally unique identifier subtype 206 corresponding to the business card information is 0x1. When the target information is the weather information, the configuration value of the organizationally unique identifier subtype 206 corresponding to the weather information is 0x2. When the target information is the internet address information, the configuration value of the organizationally unique identifier subtype 206 corresponding to the internet address information is 0x3. When the target information is the advertisement information, the configuration value of the organizationally unique identifier subtype 206 corresponding to the advertisement information is 0x4. When the target information is the location information, the configuration value of the organizationally unique identifier subtype 206 corresponding to the location information is 0x5. When the target information is the time information, the configuration value of the organizationally unique identifier subtype 206 corresponding to the time information is 0x6. When the target information is the public transportation information, the configuration value of the organizationally unique identifier subtype 206 corresponding to the public transportation information is 0x7. When the target information is the short message, the configuration value of the organizationally unique identifier subtype 206 corresponding to the short message is 0x8. In the embodiment, the organizationally unique identifier subtype 206 thereof is configured by the public activity frame shown in FIG. 2 with an example of the target information as the business card information, and it is configured as 0x1.

The step of configuring the target information to be broadcasted in an element field of the public activity frame of the MAC layer of the wireless local area network communication protocol, and generating the broadcast data in the above step S022 specifically includes the following steps.

Figure 3:
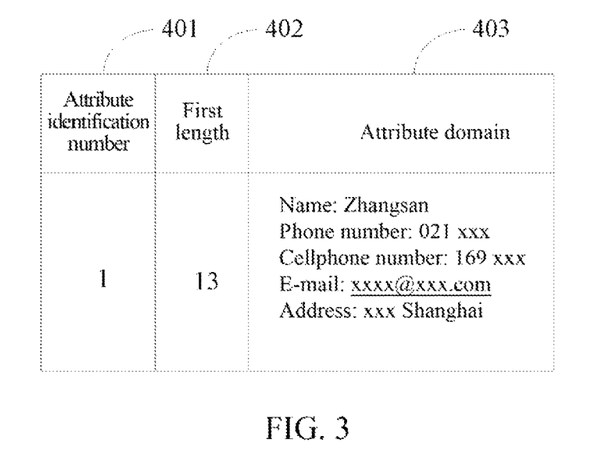
FIG. 3 is a schematic diagram of a first data frame in the method for performing a broadcast for information sharing based on Wi-Fi according to the present document.

In step S0221, according to a preset format of a first data frame, the target information to be broadcasted is configured to generate a first data frame.

Specifically, in the embodiment, the preset format of the first data frame is as shown in FIG. 3. Fields of the first data frame include an attribute identification number 401, a first length 402 and an attribute domain 403.

Herein, the above attribute identification number 401 is used for identifying an attribute of the target information. In the embodiment, for different types of public information types, the attribute identification number 401 has different meanings. For example, for the business card information, the attribute identification number 401 thereof represents the number of business cards, and for the weather information, the attribute identification number 401 represents weather conditions in different places. A specific configuration of the attribute identification number 401 may be configured according to the practical situations, and the configuration is not limited completely. Descriptions are made through an example of the business card information in the embodiment, since there is only one piece of business card information, a configuration value of the attribute identification number 401 is 1.

The above first length 402 is used for identifying a length of the target information. If the length of the target information is 13 bytes, a value of the first length 402 is 13.

The above attribute domain 403 is used for configuring specific contents of the target information. In the embodiment, by taking the business card information as an example, contents configured by the attribute domain 403 are specific contents of the corresponding business card information, including name, phone number, cellphone number, e-mail and address.

Figure 4:
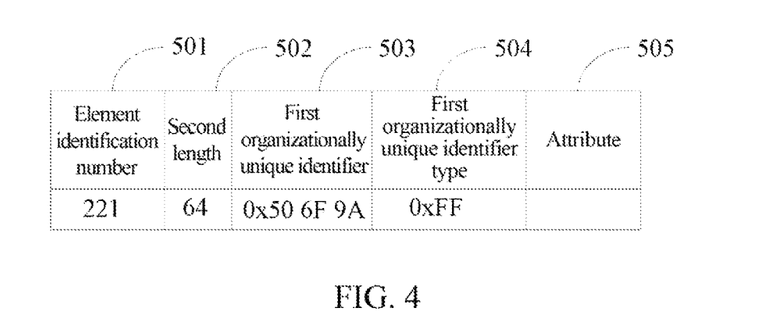
FIG. 4 is a schematic diagram of a second data frame in the method for performing a broadcast for information sharing based on Wi-Fi according to the present document.

In step S0222, according to a preset format of a second data frame, the first data frame is configured to generate a second data frame.

Specifically, according to the preset format of the first data frame as shown in FIG. 3, after the target information to be broadcasted is configured to generate the first data frame, the first data frame generated through configuration is configured in the preset second data frame. In the embodiment, the format of the second data frame is as shown in FIG. 4. The fields of the second data frame include an element identification number 501, a second length 502, a first organizationally unique identifier 503, a first organizationally unique identifier type 504 and an attribute 505. Herein, the element identification number 501 is customized by the IEEE802.11 manufacturers, in the embodiment, a value of the element identification number 501 is 221. The second length 502 is used for identifying a length of the above first data frame, in the embodiment, if the length of the above first data frame is 64, that is, the above first data frame occupies the length of 64 bytes, the value of the second length 502 is 64. The first organizationally unique identifier 503 is an organizationally unique identifier defined by the Wi-Fi alliance. In the embodiment, the value of the first organizationally unique identifier 503 is 0x50 6F 9A. The first organizationally unique identifier type 504 is used for identifying an element type of the target information. In the embodiment, the value of the first organizationally unique identifier type 504 is 0xFF. The attribute 505 is used for configuring the first data frame, that is, all contents of the first data frame shown in FIG. 3 are configured in the attribute 505 field of the second data frame shown in FIG. 4.

In step S0223, the second data frame is configured in the element field, and the broadcast data are generated.

Specifically, in the embodiment, after the second data frame as shown in FIG. 4 is obtained, the second data frame is configured in the element field 208 of the public activity frame as shown in FIG. 2, and the broadcast data are generated. In the embodiment, the broadcast data are also called the public information activity frame.

In step S03, the broadcast data are broadcasted through the Wi-Fi for a receiving terminal to receive, and the broadcast data are parsed to obtain the target information, and the target information is displayed.

Specifically, in the embodiment, after the broadcast data are generated in the step S0223, the broadcast data are broadcasted through the Wi-Fi for the receiving terminal to receive, and the receiving terminal parses the received broadcast data to obtain the target information, and displays the target information.

Herein, the receiving terminal parsing the received broadcast data to obtain the target information, and displaying the target information specifically includes the following steps.

In step S041, the receiving terminal parses the classification code and the activity code in the broadcast data. If a parsing result is identical with a set value (that is, it is identical with a configuration value, similarly hereinafter), the step proceeds to step S042.

Specifically, in the embodiment, a function of sharing the public information is implemented based on the public activity frame of the MAC of the IEEE802.11. In the standard format of the public activity frame of the MAC of the IEEE802.11, a value of the classification code thereof is 4, and a value of the activity code thereof is 9. Therefore, in the step S041, if a parsing result which is obtained through the receiving terminal parsing the classification code in the received broadcast data is 4 and a parsing result which is obtained through parsing the activity code in the broadcast data is 9, the step proceeds to step S042.

In step S042, the receiving terminal parses the organizationally unique identifier type field and the organizationally unique identifier subtype field in the broadcast data. If a parsing result is identical with a corresponding set value, the step proceeds to step S043.

Specifically, according to the foregoing descriptions, the set value of the organizationally unique identifier type in the broadcast data is 0xFF, and the set value of the business card information corresponding to the organizationally unique identifier subtype is 0x1, thus, in the step S042, if a parsing result which is obtained through the receiving terminal parsing the organizationally unique identifier type in the broadcast data is 0xFF and a parsing result which is obtained through parsing the organizationally unique identifier subtype in the broadcast data is 0x1, the step proceeds to step S043.

In step S043, the receiving terminal parses the first organizationally unique identifier type field in the second data frame. If a parsing result is identical with a set value thereof, the step proceeds to step S044.

Specifically, according to the foregoing descriptions, a set value of the first organizationally unique identifier type 504 is 0xFF, thus, if a parsing result which is obtained through the receiving terminal parsing the first organizationally unique identifier type in the second data frame is 0xFF, the step proceeds to step S044.

In step S044, the receiving terminal parses the attribute in the second data frame to obtain the first data frame.

In step S045, the attribute domain in the first data frame is parsed to obtain the target information, and the target information is displayed.

With the method for performing a broadcast for information sharing based on the Wi-Fi provided in the embodiment, firstly, when a broadcast data request is detected, target information to be broadcasted in the broadcast data request is acquired; secondly, according to a preset configuration rule, the target information is configured to generate broadcast data; finally, the broadcast data are broadcasted through the Wi-Fi for a receiving terminal to receive, and the broadcast data are parsed to obtain the target information, and the target information is displayed. In the embodiment, broadcasting and receiving of information can be achieved in a case of not establishing a connection between user terminals, so that the present document is maintained conveniently, costs low, and does not require excessive user interventions.

The present document also provides a device for performing a broadcast for information sharing based on Wi-Fi.

Figure 5:
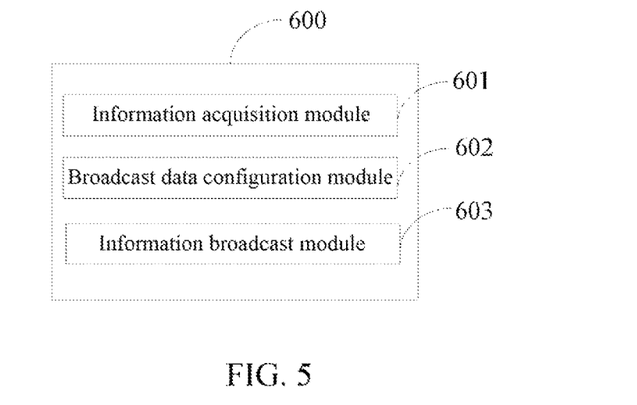
FIG. 5 is a structure diagram of modules of a device for performing a broadcast for information sharing based on Wi-Fi according to an embodiment of the present document.

With reference to FIG. 5, FIG. 5 is a structure diagram of modules of a device for performing a broadcast for information sharing based on Wi-Fi according to an embodiment of the present document.

In one embodiment, the device 600 for performing a broadcast for information sharing based on the Wi-Fi includes an information acquisition module 601, a broadcast data configuration module 602 and an information broadcast module 603.

Herein, the above information acquisition module 601 is configured to, when a broadcast data request is detected, acquire target information to be broadcasted in the broadcast data request. In the embodiment, the target information to be broadcasted may be help information, business card information, weather information, internet address information, advertisement information, location information, time information, public transportation information or short message or the like.

The above broadcast data configuration module 602 is configured to, according to a preset configuration rule, configure the target information to generate broadcast data.

Specifically, in the embodiment, when the information acquisition module 601 acquires the target information to be broadcasted, the broadcast data configuration module 602 configures the acquired target information to generate broadcast data according to the preset configuration rule. The broadcast data configuration module 602 is configured to, acquire an information type identifier of the target information to be broadcasted and a public information activity frame identifier. Specifically, according to the descriptions above, information types of the target information to be broadcasted include the help information, business card information, weather information, internet address information, advertisement information, location information, time information, public transportation information and short message and so on. Each type of the target information above is identified in the embodiment. Herein, the help information is identified as 0x0 (0x represents a hexadecimal, similarly hereinafter). The business card information is identified as 0x1. The weather information is identified as 0x2. The internet address information is identified as 0x3. The advertisement information is identified as 0x4. The location information is identified as 0x5. The time information is identified as 0x6. The public transportation information is identified as 0x7. And the short message is identified as 0x8. A public information activity frame is identified as 0xFF in the embodiment. For example, when the target information is the business card information, an information type of the target information to be broadcasted acquired by the broadcast data configuration module 602 is 0x1, and the acquired public information activity frame is 0xFF.

The broadcast data configuration module 602 is further configured to, configure the public information activity frame identifier in an organizationally unique identifier type field of a public activity frame of an MAC layer of a wireless local area network communication protocol, configure the information type identifier of the target information in an organizationally unique identifier subtype field of the public activity frame of the MAC layer of the wireless local area network communication protocol, configure the target information to be broadcasted in an element field of the public activity frame of the MAC layer of the wireless local area network communication protocol, and generate the broadcast data. In the embodiment, the broadcast data are also called the public information activity frame.

In the embodiment, the foregoing wireless local area network communication protocol is IEEE802.11. FIG. 2 is a schematic diagram of a standard format of the public activity frame in the method for performing a broadcast for information sharing based on Wi-Fi according to the present document. With reference to FIG. 2, in the embodiment, the public activity frame of the Medium Access Control MAC layer of the IEEE802.11 includes an MAC header 100, an activity segment 200 and a check value 300. Herein, fields of the MAC header 100 include frame control 101, a duration time 102, a destination address 103, a source address 104, a basic service set identifier 105 and sequence control 106. Fields of the activity segment 200 include a classification code 201, an activity code 202, classification 203, an organizationally unique identifier 204, an organizationally unique identifier type 205, an organizationally unique identifier subtype 206, a session token 207 and an element 208. And the check value 300 includes frame check 301. In the embodiment, according to the definition of the public activity frame of the MAC of the IEEE802.11 in the IEEE802.11, a value of the above classification code 201 is 4, which represents that the data frame shown in FIG. 2 is a public activity frame, and a value of the above activity code 202 is 9, which represents that the data frame shown in FIG. 2 is an activity frame customized by IEEE802.11 manufacturers.

Moreover, the classification 203 in the activity segment 200 is customized by the IEEE802.11 manufacturers. In the embodiment, the value of the classification 203 is 0x7F. The organizationally unique identifier 204 is an organizationally unique identifier defined by the Wi-Fi alliance. In the embodiment, the value of the organizationally unique identifier is 0x50 6F 9A, and the value of the session token 207 is 0x1. The organizationally unique identifier type 205, organizationally unique identifier subtype 206 and element 208 are three fields required to be extended by the above preset configuration rule in the embodiment.

In the embodiment, the broadcast data configuration module 602 configures the public information activity frame identifier in the organizationally unique identifier type field of the public activity frame of the MAC layer of the wireless local area network communication protocol; and configures the information type identifier of the target information in the organizationally unique identifier subtype field of the public activity frame of the MAC layer of the wireless local area network communication protocol. According to the foregoing descriptions, since the public information activity frame is identified as 0xFF in the embodiment, that is, a configuration value of the organizationally unique identifier type 205 in the public activity frame shown in FIG. 2 is 0xFF (in the embodiment, the configuration value of the organizationally unique identifier type 205 may be any value which is not occupied, that is, the value of the above public information activity frame identifier may be any value which is not occupied). Configuration values of the organizationally unique identifier subtype 206 corresponding to various types of the target information are as shown in Table 1.

TABLE 1

| Organizationally unique identifier subtype | Type of target information |
| --- | --- |
| 0x0 | Help information |
| 0x1 | Business card information |
| 0x2 | Weather information |
| 0x3 | Internet address information |
| 0x4 | Advertisement information |
| 0x5 | Location information |
| 0x6 | Time information |

TABLE 1-continued

| Organizationally unique identifier subtype | Type of target information |
|---|---|
| 0x7 | Public transportation information |
| 0x8 | Short message |
| 0x9 | Reserved |

That is, when the target information is the help information, a configuration value of the organizationally unique identifier subtype 206 corresponding to the help information is 0x0. When the target information is the business card information, the configuration value of the organizationally unique identifier subtype 206 corresponding to the business card information is 0x1. When the target information is the weather information, the configuration value of the organizationally unique identifier subtype 206 corresponding to the weather information is 0x2. When the target information is the internet address information, the configuration value of the organizationally unique identifier subtype 206 corresponding to the internet address information is 0x3. When the target information is the advertisement information, the configuration value of the organizationally unique identifier subtype 206 corresponding to the advertisement information is 0x4. When the target information is the location information, the configuration value of the organizationally unique identifier subtype 206 corresponding to the location information is 0x5. When the target information is the time information, the configuration value of the organizationally unique identifier subtype 206 corresponding to the time information is 0x6. When the target information is the public transportation information, the configuration value of the organizationally unique identifier subtype 206 corresponding to the public transportation information is 0x7. And when the target information is the short message, the configuration value of the organizationally unique identifier subtype 206 corresponding to the short message is 0x8. (The organizationally unique identifier subtype 206 thereof is configured by the public activity frame shown in FIG. 2 with an example of the target information as the business card information, that is, it is configured as 0x1).

Herein, a specific process of the broadcast data configuration module 602 configuring the target information to be broadcasted in an element field of the public activity frame of the MAC layer of the wireless local area network communication protocol, and generating the broadcast data is described as follows.

Firstly, the broadcast data configuration module 602 configures the target information to be broadcasted to generate a first data frame according to a preset format of a first data frame.

Specifically, in the embodiment, the preset format of the first data frame is as shown in FIG. 3. The fields of the first data frame include an attribute identification number 401, a first length 402 and an attribute domain 403. Herein, the above attribute identification number 401 is used for identifying an attribute of the target information. In the embodiment, for different types of public information types, the attribute identification number 401 has different meanings. For example, for the business card information, the attribute identification number 401 thereof represents the number of business cards, and for the weather information, the attribute identification number 401 represents weather conditions in different places. A specific configuration of the attribute identification number 401 may be configured according to the practical situations, and the configuration is not limited completely. Descriptions are made through an example of the business card information in the embodiment, since there is only one piece of business card information, a configuration value of the attribute identification number 401 is 1. The above first length 402 is used for identifying a length of the target information, if the length of the target information is 13 bytes, a value of the first length 402 is 13. The above attribute domain 403 is used for configuring specific contents of the target information. In the embodiment, by taking the business card information as an example, contents configured by the attribute domain 403 are specific contents of the corresponding business card information, including name, phone number, cellphone number, e-mail and address.

Secondly, the broadcast data configuration module 602 configures the above first data frame to generate a second data frame according to a preset format of the second data frame.

Specifically, according to the preset format of the first data frame as shown in FIG. 3, after the target information to be broadcasted is configured to generate the first data frame, the first data frame is configured in the preset second data frame. In the embodiment, the format of the second data frame is as shown in FIG. 4. The fields of the second data frame include an element identification number 501, a second length 502, a first organizationally unique identifier 503, a first organizationally unique identifier type 504 and an attribute 505. Herein, the element identification number 501 is customized by the IEEE802.11 manufacturers, in the embodiment, a value of the element identification number 501 is 221. The second length 502 is used for identifying a length of the above first data frame. In the embodiment, if the length of the above first data frame is 64, that is, the above first data frame occupies the length of 64 bytes, the value of the second length 502 is 64. The first organizationally unique identifier 503 is an organizationally unique identifier defined by the Wi-Fi alliance. In the embodiment, the value of the first organizationally unique identifier 503 is 0x50 6F 9A. The first organizationally unique identifier type 504 is used for identifying an element type of the target information. In the embodiment, the value of the first organizationally unique identifier type 504 is 0xFF. The attribute 505 is used for configuring the first data frame, that is, all contents of the first data frame shown in FIG. 3 are configured in the attribute 505 field of the second data frame shown in FIG. 4.

Finally, the broadcast data configuration module 602 configures the second data frame in the element field 208 of the public activity frame as shown in FIG. 2, and generates the broadcast data.

The above information broadcast module 603 is configured to broadcast the broadcast data through the Wi-Fi for a receiving terminal to receive, parse the broadcast data to obtain the target information, and display the target information.

Figure 6:
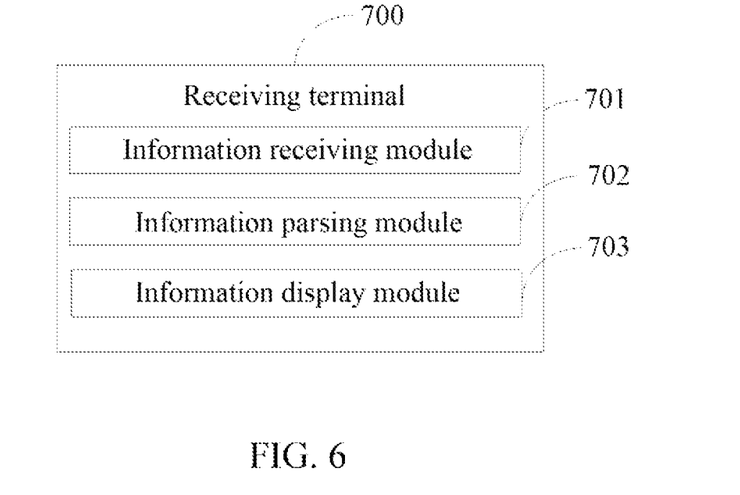
FIG. 6 is a structure diagram of modules of a receiving terminal in the device for performing a broadcast for information sharing based on Wi-Fi according to an embodiment of the present document.

With reference to FIG. 6, FIG. 6 is a structure diagram of modules of a receiving terminal in the device for performing a broadcast for information sharing based on Wi-Fi according to an embodiment of the present document.

In the embodiment, a receiving terminal 700 includes an information receiving module 701, an information parsing module 702 and an information display module 703.

Herein, the above information receiving module 701 is configured to receive broadcast data.

The above information parsing module 702 is configured to parse the broadcast data received by the information receiving module 701 into target information.

Specifically, when the information receiving module 701 receives the broadcast data, the information parsing module 702 parses the broadcast data into the target information.

In the embodiment, the information parsing module 702 is configured as follows.

Firstly, the information parsing module 702 parses a classification code and an activity code of the broadcast data. If a parsing result is identical with a corresponding set value thereof, the information parsing module 702 continues to parse an organizationally unique identifier type field and an organizationally unique identifier subtype field in the broadcast data. In the embodiment, a function of sharing the public information is implemented based on the public activity frame of the MAC of the IEEE802.11, and in the standard format of the public activity frame of the MAC of the IEEE802.11, the value of the classification code thereof is 4, and the value of the activity code thereof is 9. Therefore, if a parsing result which is obtained through the information parsing module 702 parsing the classification code in the received broadcast data is 4 and a parsing result which is obtained by parsing the activity code in the broadcast data is 9, the information parsing module 702 continues to parse the organizationally unique identifier type field and the organizationally unique identifier subtype field in the broadcast data.

In the embodiment, since the set value of the organizationally unique identifier type in the broadcast data is 0xFF, and the set value of the business card information corresponding to the organizationally unique identifier subtype is 0x1, thus, if a parsing result which is obtained through the information parsing module 702 parsing the organizationally unique identifier type in the broadcast data is 0xFF and a parsing result which is obtained through parsing the organizationally unique identifier subtype in the broadcast data is 0x1, the information parsing module 702 continues to parse a first organizationally unique identifier type field in the second data frame.

In the embodiment, since the set value of the first organizationally unique identifier type 504 is 0xFF, thus, if a parsing result which is obtained through the information parsing module 702 parsing the first organizationally unique identifier type in the second data frame is 0xFF, the information parsing module 702 continues to parse an attribute in the second data frame to obtain the first data frame; then, the information parsing module 702 parses an attribute domain in the first data frame to obtain the target information.

The above information display module 703 is configured to display the target information.

With the device for performing a broadcast for information sharing based on the Wi-Fi provided in the embodiment, firstly, when a broadcast data request is detected, an information acquisition module acquires target information to be broadcasted in the broadcast data request; secondly, according to a preset configuration rule, a broadcast data configuration module configures the target information to generate broadcast data; finally, an information broadcast module broadcasts the broadcast data through the Wi-Fi for a receiving terminal to receive, and parses the broadcast data to obtain the target information, and displays the target information. In the embodiment, with the device for performing a broadcast for information sharing based on the Wi-Fi, broadcasting and receiving of the public information can be achieved in a case of not establishing a connection between user terminals, so that the embodiment is maintained conveniently, costs low, and does not require excessive user interventions.

The above description of specific embodiments of the present document does not limit the patent scope of the present document. Equivalent structures or equivalent flow transformations made by using the contents of the specification and accompanying drawings of the present document, which are or directly or indirectly applied in other related technical fields, are all included in the patent protection scope of the present document similarly.

INDUSTRIAL APPLICABILITY

As mentioned above, through the above embodiments and implementation modes, broadcasting and receiving of information can be achieved in a case of not establishing a connection between user terminals, so that the present document is maintained conveniently, costs low, and does not require excessive user interventions.

What we claim is:

1. A method for performing a broadcast for information sharing based on Wi-Fi, comprising the following steps:
   acquiring target information to be broadcasted in a broadcast data request when the broadcast data request is detected;
   configuring the target information to generate broadcast data according to a preset configuration rule; and
   broadcasting the broadcast data through the Wi-Fi for a receiving terminal to receive, parse the broadcast data to obtain the target information, and display the target information;
   wherein, the step of configuring the target information to generate broadcast data according to a preset configuration rule comprises:
   acquiring an information type identifier of the target information to be broadcasted and a public information activity frame identifier;
   configuring the public information activity frame identifier in an organizationally unique identifier type field of a public action frame of an MAC layer of a wireless local area network communication protocol, configuring the information type identifier of the target information in an organizationally unique identifier subtype field of the public action frame of the MAC layer of the wireless local area network communication protocol, configuring the target information to be broadcasted in an element field of the public action frame of the MAC layer of the wireless local area network communication protocol, and generating the broadcast data.

2. The method for performing a broadcast for information sharing based on the Wi-Fi of claim 1, wherein, said configuring the target information to be broadcasted in an element field of the public action frame of the MAC layer of the wireless local area network communication protocol, and generating the broadcast data comprises:
   according to a preset format of a first data frame, configuring the target information to be broadcasted to generate the first data frame;
   according to a preset format of a second data frame, configuring the first data frame to generate the second data frame; and
   configuring the second data frame in the element field, and generating the broadcast data.

3. The method for performing a broadcast for information sharing based on the Wi-Fi of claim 2, wherein,
   the first data frame comprises an attribute identification number field, a first length field and an attribute domain field; the attribute identification number field is used for identifying an attribute of the target information, the first length field is used for identifying a length of the target information, and the attribute domain field is used for configuring content of the target information;

the second data frame comprises a second length field, a first organizationally unique identifier type field and an attribute field; the second length field is used for identifying a length of the first data frame; the first organizationally unique identifier type field is used for identifying an element type of the target information; and the attribute field is used for configuring the first data frame.

4. A device for performing a broadcast for information sharing based on Wi-Fi, comprising hardware performing instructions stored in a non-transitory computer readable medium which executes steps in following modules: an information acquisition module, a broadcast data configuration module and an information broadcast module; wherein, the information acquisition module is configured to, when a broadcast data request is detected, acquire target information to be broadcasted in the broadcast data request;

the broadcast data configuration module is configured to, acquire an information type identifier of the target information to be broadcasted and a public information activity frame identifier; configure the public information activity frame identifier in an organizationally unique identifier type field of a public action frame of an MAC layer of a wireless local area network communication protocol, configure the information type identifier of the target information in an organizationally unique identifier subtype field of the public action frame of the MAC layer of the wireless local area network communication protocol, configure the target information to be broadcasted in an element field of the public action frame of the MAC layer of the wireless local area network communication protocol, and generate the broadcast data; and the information broadcast module is configured to broadcast the broadcast data through the Wi-Fi for a receiving terminal to receive, parse the broadcast data to obtain the target information, and display the target information.

5. The device for performing a broadcast for information sharing based on the Wi-Fi of claim 4, wherein, the broadcast data configuration module is further configured to, according to a preset format of a first data frame, configure the target information to be broadcasted to generate the first data frame; according to a preset format of a second data frame, configure the first data frame to generate the second data frame; and configure the second data frame in the element field, and generate the broadcast data.

6. The device for performing a broadcast for information sharing based on the Wi-Fi of claim 5, wherein, the first data frame comprises an attribute identification number field, a first length field and an attribute domain field; the attribute identification number field is used for identifying an attribute of the target information, the first length field is used for identifying a length of the target information, and the attribute domain field is used for configuring content of the target information;

the second data frame comprises a second length field, a first organizationally unique identifier type field and an attribute field; the second length field is used for identifying a length of the first data frame; the first organizationally unique identifier type field is used for identifying an element type of the target information; and the attribute field is used for configuring the first data frame.

* * * * *